(No Model.)  J. L. ABELL.  2 Sheets—Sheet 1.
MOWING MACHINE.
No. 249,732. Patented Nov. 22, 1881.
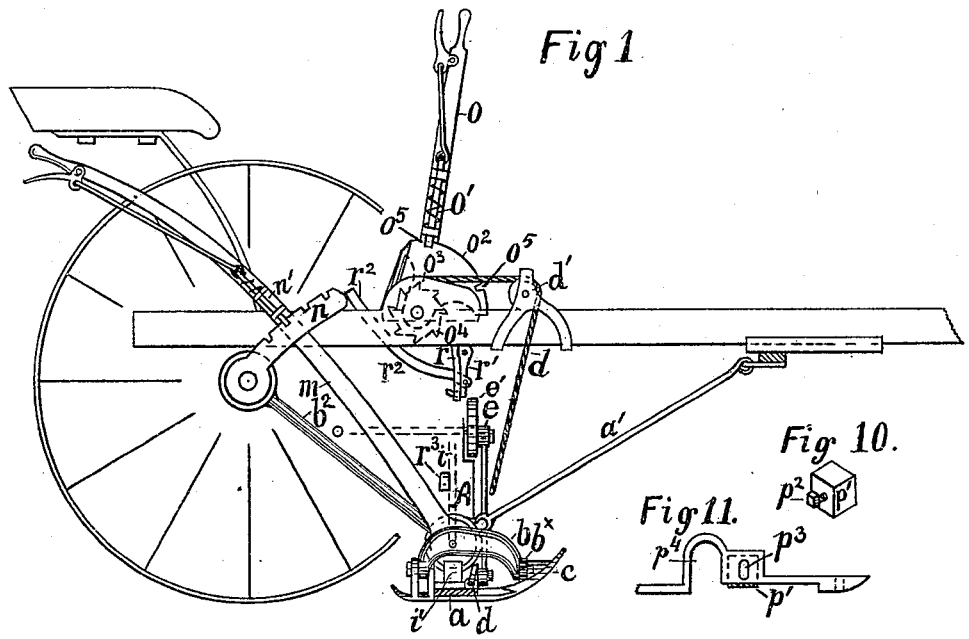
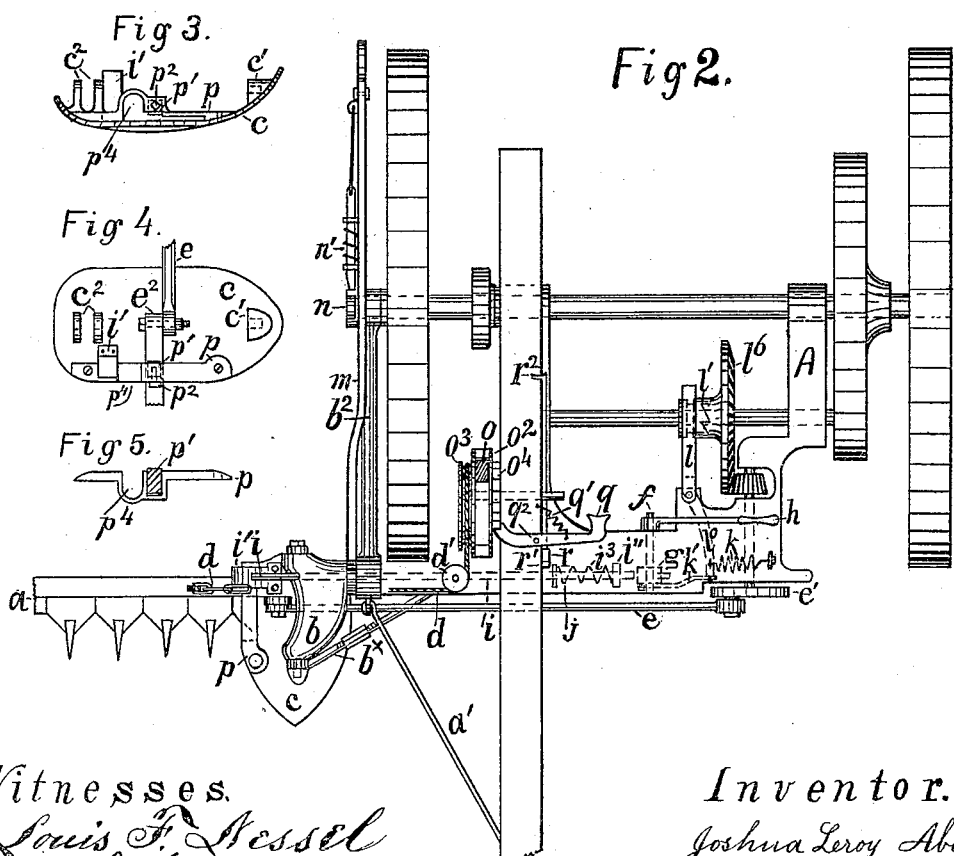
Witnesses.
Louis F. Nessel
Jno. L. Hutchinson
Inventor.
Joshua Leroy Abell
By Wm Zimmerman
Atty

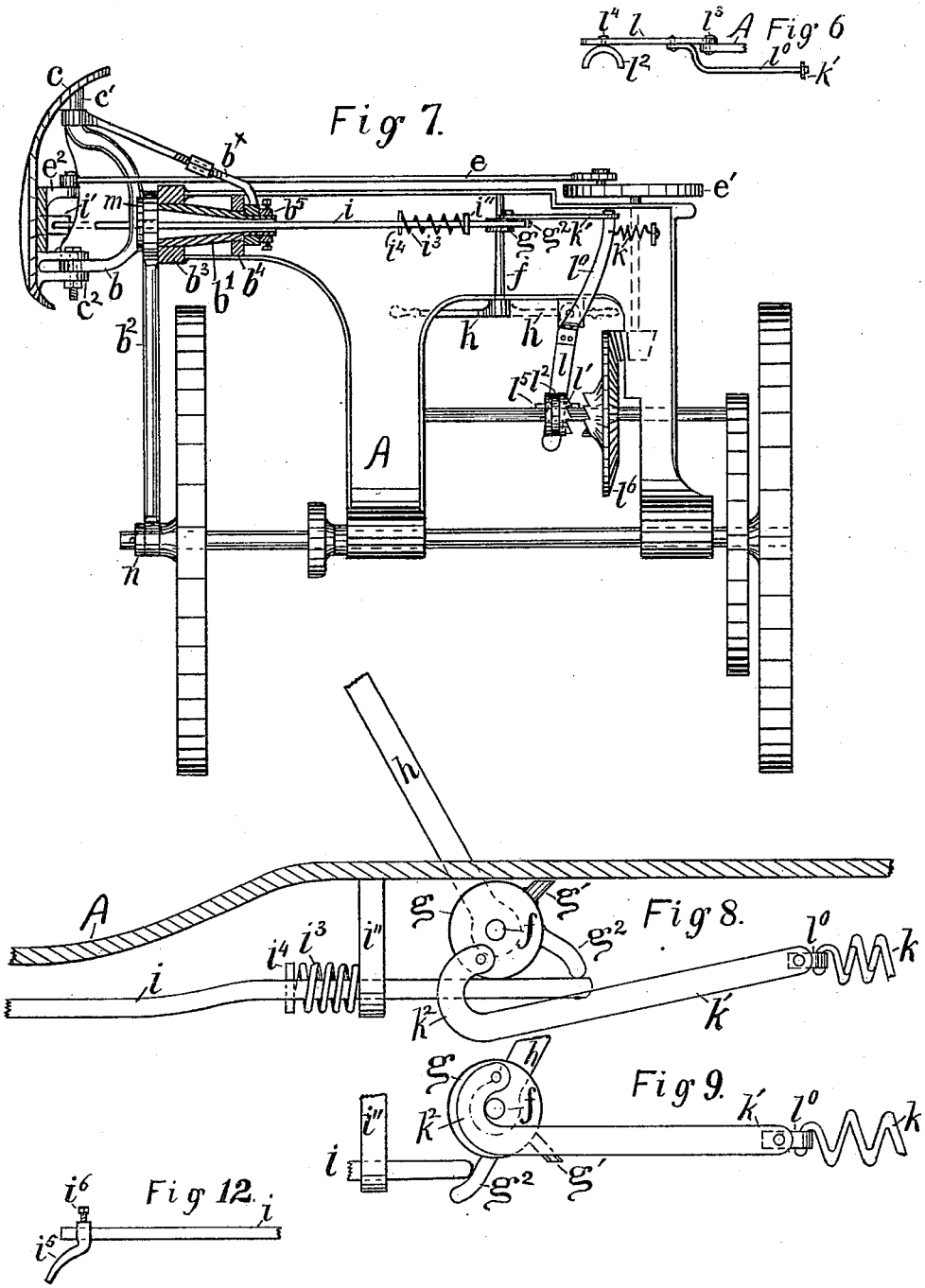

UNITED STATES PATENT OFFICE.

JOSHUA LEROY ABELL, OF CHICAGO, ILLINOIS.

MOWING-MACHINE.

SPECIFICATION forming part of Letters Patent No. 249,732, dated November 22, 1881.

Application filed July 11, 1881. (No model.)

*To all whom it may concern:*

Be it known that I, JOSHUA LEROY ABELL, of Chicago, in the county of Cook and State of Illinois, have invented certain new and useful Improvements in Mowing-Machines; and I hereby declare the following to be a full, clear, and exact description thereof, which will enable others skilled in the art to which my invention relates to make and use the same, reference being had to the accompanying drawings, forming a part hereof, and in which—

Figure 1 represents a side view of a mowing-machine with my improvements attached. Fig. 2 represents a plan view of the same with the clutch $l'$ in gear. Fig. 3 represents a side view of the shoe $c$, and Fig. 4 represents a plan view of the same. Fig. 5 represents an inside view of the rub-iron $p$ and end view of the block $p'$. Fig. 6 represents a side view of the lever $l$, with yoke $l^2$, and end view of connecting-rod $k'$. Fig. 7 represents a view of the under side of a mower, with my attachment in position, when traveling on the road. Fig. 8 represents an enlarged side view of the like parts, shown in the same position in Fig. 7. Fig. 9 represents the same parts, as shown in Figs. 7 and 8, when the mower is at work. Fig. 10 represents the block $p'$, with its bolt. Fig. 11 represents the rub-iron $p$, showing the vertical slot $p^3$, in which the bolt $p^2$ works, the block and its bolt being removed. Fig. 12 represents the outer end of the bar $i$, provided with an adjustable wiper, $i^5$, and set-screw $i^6$.

Like letters of reference indicate like parts.

My invention relates to mechanism constructed for the purpose of elevating and lowering the points of the guards from and toward the ground; also, in mechanism for the purpose of raising the frame and finger-bar to the desired position for traveling from the field, and which, during such motion of the finger-bar, automatically opens the clutch $l'$, by means of intermediate mechanism, which then holds it open, the same mechanism also holding the clutch closed or engaged after it is so placed; and it also further consists in applying a rub-iron to the shoe provided with an adjustable block, by means of which the wear to the parts caused by the motion of the sickle may be compensated for, all constructed substantially as shown.

In the drawings, A represents the frame of an ordinary mower, the bevel-wheel $l^6$ of which runs loosely upon its shaft when free from the clutch $l'$. The clutch $l'$ is made to turn with the shaft by means of the feather $l^5$, and has a groove in its circumference, in which works a yoke, $l^2$, pivoted to the lever $l$ at $l^4$. Said lever is pivoted to the frame A at $l^3$, and has attached to it an arm, $l^0$, which passes to the under side of the frame A, and has attached to it, near its forward end, a spring, $k$, and at its end is attached a link, $k'$, so as to work pivotally upon the end of the lever. The other end of said link is formed into a hook, $k^2$, and is attached by a pivot to a drum, $g$, attached to the shaft $f$, attached to the under side of the frame A, as shown, and to which are attached spurs $g'$ and $g^2$. To the shaft $f$ is also attached a lever, $h$, and to the frame A is attached a lug, $i''$, through which passes a bar, $i$, constructed so that its end may just pass freely under the drum $g$, and against said lug $i''$ presses a spring, $i^3$, coiled around the bar $i$, and of which the other end presses against a pin, $i^4$, passed through the bar $i$. The bar $i$ passes through the hollow shaft $b'$ of the yoke $b$, and through a hole in the yoke $b$, in which it works. The shaft $b'$ works in the bearings $b^3$ and $b^4$, forming a part of the frame A, and is held in place by a collar, $b^5$, resting against the adjustable brace $b^\times$. The shaft $b'$, with its bearings and end of brace and collar just described, are shown in section. The shaft $b'$ passes, so as to turn freely, through the end of a brace, $b^2$, outside of the frame A, the other end of which is attached to the axle of the mower, and immediately outside of this brace is firmly attached to the shaft $b'$ a lever, $m$, provided with a spring-bolt, $n'$, which works in a notched segment, $n$, firmly attached to the hub of the brace $b^2$.

To the yoke $b$ is attached a shoe, $c$, provided at its toe with a socket, $c'$, into which a pin or bearing of the yoke $b$ works. The socket and bearing are preferably made as parts of the yoke and shoe respectively. At the heel of said shoe are one or more lugs, $c^2$, between which the rear end of the yoke works, and is pivoted thereto by a bolt, as shown. Near the heel of the shoe is attached, either adjustably or permanently, a flat plate, $i'$, standing upward and outward at an angle of about forty-five degrees, and to the outer edge of the shoe is fastened a rub-iron, $p$, which holds down and guides the inner end of the sickle, and which is provided with a socket or chamber, into which is fitted a block of metal, held in its place by a bolt, $p^2$, threaded into it, and which works in a vertical slot, $p^3$.

At a suitable distance out from the pivotal points of the shoe $c$, and on the finger-bar $a$, is attached a chain, $d$, which passes up over a pulley, $d'$, held by a bracket fastened to the tongue, and thence over an oval-shaped or eccentric sheave, $o^3$, to which its other end is fastened. Said sheave is attached to and forms a part of a slotted quadrant, $o^2$, and to the other side of said quadrant is attached a ratchet-wheel, $o^4$. Within said slotted quadrant works a lever, $o$, attached to the axle, which forms the common center of the said sheave, quadrant, and ratchet-wheel. Said lever is provided with a spring-bolt, $o'$, which works into the notches $o^5$ of the quadrant.

Upon the tongue, at $q^2$, is pivoted a lever, $q$, one end of which engages with the ratchet-wheel $o^4$, when operated by the foot of the driver at its opposite end, and which is disengaged by the force of the spring $q'$; or in this case the reverse condition might be preferred and the lever or equivalent stop be constantly engaged with the ratchet-wheel $o^4$ until disengaged. To the under side of the tongue is also attached a brace or stud, $r$, and a hook, $r'$, to which a rod, $r^2$, is attached in convenient reach for the driver's foot, and to the top of the frame A is attached a staple or hook, $r^3$, into which the hook $r'$ catches and holds the frame when raised to it. To the brace $b^2$ is also attached a draft-rod, $a'$, passed up under the tongue and attached to the double-tree, held to the tongue by a sliding support, and the sickle to the pitman-rod $e$ and crank-wheel $e'$ in the usual manner.

The rod $i$ may be bent downward at its outer end, so as to be operated directly by the finger-bar, and then the wiper $i'$ may be dispensed with, or the rod $i$ may be provided with an adjustable wiper, $i^5$, held in place by a set-screw, $i^6$, as shown.

The adjustable brace $b^\times$ gives great strength to the yoke and, as it forms a part thereof, always vibrates with it, and can by the turn-buckle be adjusted and permanently held to any desired strain.

The rub-iron $p$ may be made as a separate piece and bolted to the shoe $c$, as shown; or, preferably, it may be cast with the shoe in one piece and provided with an adjustable block set in a chamber, in which it is held by a set-screw, $p^2$, and adjusted thereby as the block or sickle-bar wears away, and for the purpose of drawing the sickle-bar out without removing the rub-iron, an arch, $p^4$, is formed on one side of the block for the purpose of passing the permanently-attached pins on the sickle-bar, as constructed and shown in my former Letters Patent, No. 236,400, dated January 11, 1881.

When, in operation, it is desired to tilt the finger-bar downward so as to cut close, or the reverse, the driver seizes the lever $m$, and by means of the bolt $n'$ sets and fastens the lever into one of the notches of the segment $n$. When it is desired to pass the cutter-bar over a low obstruction the lever $o$ is drawn back until it strikes the axle of the machine. By this time the staple $r^3$ has caught on the hook $r'$, but may be disengaged by the foot of the driver pressing on the rod $r^2$. If the obstruction should prove still too high the hook $r'$ is allowed to catch in the staple $r^3$, and the lever $q$ is caught in the ratchet-wheel $o^4$, thus holding the several parts in place. The lever $o$ is then brought forward, so that its bolt $o'$ may catch in the forward notch, $o^5$, and be drawn back again. By the time the lever begins to draw back the second time the wiper $i'$ on the shoe $c$ strikes the end of the rod $i$, which is caused to move its other end, pushing against the spur $g^2$ of the drum $g$, causing it to turn from the position shown in Fig. 9 to that shown in Fig. 8. The spring $k$ being in constant tension will throw the drum $g$ around suddenly after the pivot of the hook $k^2$ has passed the center of the shaft $f$, and be arrested by the spur $g'$ striking against the frame A. During the motion of the lever $o$ the clutch $l'$ is quickly thrown out of gear at the proper moment, which thus stops the motion of the sickle, and the continued motion of the lever $o$ brings the sickle-bar to its vertical position by the time the lever has reached the limit of its motion. In letting the frame down the stop $q$ is released from the ratchet-wheel $o^4$ and the hook $r$ from the staple $r^3$, and by two movements of the lever $o$, as before described, the finger-bar is laid upon the ground and the rod $i$, by means of the spring $i^3$, pushed out from under the drum $g$; but by the action of the spring $k$ the drum, and thereby the clutch, are all held in the open position until the lever $h$ is moved by hand until the hook $k^2$ has passed the center of the shaft $f$, after which, by the action of the spring $k$, it will move into the position shown dotted in Fig. 7, when the clutch will be engaged with the wheel $l^6$ and so held by the action of the spring $k$. The pivot of the hook $k^2$ being thrown above the center of the shaft $f$, is held by the tension of the spring $k$, the hook $k^2$ striking against the shaft $f$, and thus arresting further motion. The block $p'$ rests upon the sickle-bar, and by being made adjustable compensates for the wear at that point caused by the motion of the sickle-bar.

The lever $m$, fulcrumed on the axle of the machine through the segment $n$, forms a convenient arrangement by which the frame A and finger-bar may be quickly lifted over low obstructions by simply pressing down upon the free end of the lever, the draft of the rod $a'$ in this case helping in the same direction. The brace $b^2$, placed on the axle outside the wheel and frame, greatly lightens the strain on and strengthens the frame.

Having thus described my invention, what I claim as new is—

1. The combination of the frame A, yoke $b$, having shaft $b'$, lever $m$, provided with bolt $n'$, and brace $b^2$, provided with notched segment $n$, substantially as specified.

2. The combination of the rocking yoke $b$, pivoted shoe $c$, having a wiper $i'$, rod $i$, spring $i^3$, drum $g$, provided with spurs $g'$ $g^2$, link $k'$, spring $k$, lever $l$ $l^0$, clutch $l'$, and gear-wheel $l^6$, constructed and combined to operate substantially as shown and described.

3. The sheave $o^3$, notched segment $o^2$, and ratchet-wheel $o^4$, united into a single piece having a slot between the sheave and segment, in which plays the lever $o$, provided with spring-bolt $o'$, working into the notches $o^5$ of segment $o^2$, and said sheave, segment, ratchet-wheel, and lever operating on a common axis, in combination with the chain $d$, sheave $d'$, finger-bar $a$, and spring-pawl $q$, all combined substantially as and for the purpose specified.

4. The combination, with the frame A, provided with staple $r^3$, of the stop $r$, hook $r'$, and rod $r^2$, constructed and arranged to operate as specified.

5. The combination, with the sickle-bar $e^2$, of the rub-iron $p$, provided with adjustable block $p'$, substantially as specified.

6. The feathered clutch $l'$, provided with yoke $l^2$, lever $l$ $l^0$, hooked link $k'$, spring $k$, drum $g$, shaft $f$, and operative mechanism, substantially as and for the purpose specified.

7. In combination with the wiper $i'$, arranged so as to receive its motion from the finger-bar, mechanism to open and close the clutch $l'$ and hold it securely in either position, substantially as specified.

8. The combination, with the hinged and vertically-swinging finger-bar, of the reciprocating rod $i$, clutch $l'$, and intermediate mechanism whereby said clutch is opened and closed, substantially as and for the purpose specified.

9. In combination with the oscillating yoke $b$, provided with hollow shaft $b'$ and bearings $b^3$ $b^4$, the adjustable brace $b^2$, substantially as specified.

10. In combination with the hinged and vertically-swinging finger-bar and yoke provided with hollow shaft $b'$, the reciprocating rod $i$, clutch $l'$, and intermediate mechanism for the purpose of stopping and starting the sickle, substantially as and for the purpose specified.

11. The combination, with the frame A, provided with the staple $r^3$ and lever $m$, fulcrumed on the axle of the wheels, of the stop $r$, hook $r'$, and rod $r^2$, substantially as and for the purpose specified.

12. The combination, with the lever $o$, sheaves $o^3$ $d'$, and chain $d$, of the frame A, staple $r^3$, stop $r$, hook $r'$, and rod $r^2$, substantially as specified.

13. The finger-bar $a$, chain $d$, pivoted shoe $c$, attached to yoke $b$, provided with hollow shaft $b'$, brace $b^2$, lever $m$, having bolt $n'$, segment $n$, sheave $o^3$, notched quadrant $o^2$, ratchet-wheel $o^4$, lever $o$, provided with bolt $o'$, stop $q$, rod $i$, shaft $f$, drum $g$, levers $h$, $l$, and $l^0$, link $k'$, spring $k$, clutch $l'$, and gear-wheel $l^6$, all constructed and arranged to operate substantially as specified.

JOSHUA LEROY ABELL.

Witnesses:
WM. ZIMMERMAN,
LOUIS F. NESSEL.